(12) United States Patent
Circlaeys et al.

(10) Patent No.: US 8,582,952 B2
(45) Date of Patent: Nov. 12, 2013

(54) METHOD AND APPARATUS FOR IDENTIFYING VIDEO TRANSITIONS

(75) Inventors: Eric M. Circlaeys, Paris (FR); Kjell Bronder, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 375 days.

(21) Appl. No.: 12/560,005

(22) Filed: Sep. 15, 2009

(65) Prior Publication Data

US 2011/0064381 A1    Mar. 17, 2011

(51) Int. Cl.
| | |
|---|---|
| *H04N 5/91* | (2006.01) |
| *H04N 9/80* | (2006.01) |
| *H04N 5/93* | (2006.01) |
| *H04N 5/14* | (2006.01) |
| *G11B 27/00* | (2006.01) |

(52) U.S. Cl.
USPC .......................................................... 386/241

(58) Field of Classification Search
None
See application file for complete search history.

(56) References Cited

U.S. PATENT DOCUMENTS

| 6,055,025 | A | 4/2000 | Shahraray |
| 6,549,643 | B1 | 4/2003 | Toklu et al. |
| 6,738,100 | B2 | 5/2004 | Hampapur et al. |
| 2001/0003468 | A1* | 6/2001 | Hampapur et al. ........... 348/700 |
| 2003/0053538 | A1* | 3/2003 | Katsavounidis et al. 375/240.01 |
| 2009/0034937 | A1* | 2/2009 | Kusunoki et al. ............... 386/96 |

FOREIGN PATENT DOCUMENTS

| JP | 7-79431 A | 3/1995 |
| WO | WO-2005074297 A1 | 8/2005 |

\* cited by examiner

*Primary Examiner* — Thai Tran
*Assistant Examiner* — Sunghyoun Park
(74) *Attorney, Agent, or Firm* — Wong, Cabello, Lutsch, Rutherford & Brucculeri, LLP

(57) ABSTRACT

The disclosure addresses methods and apparatus for evaluating video presentations, particularly those displaying a succession of generally static images to identify the transition from a first image to a second image. The change of images facilitates the insertion of chapter markers which may be later used to index the content of the video and to facilitate navigation to selected content in the video. In one implementation, a difference measurement will be made between selected frames of the video presentation and evaluated with a statistical measure of the magnitude of the difference measurements, such as a Root Mean Square analysis. In preferred implementations, all processing will be done in the digital domain.

14 Claims, 5 Drawing Sheets

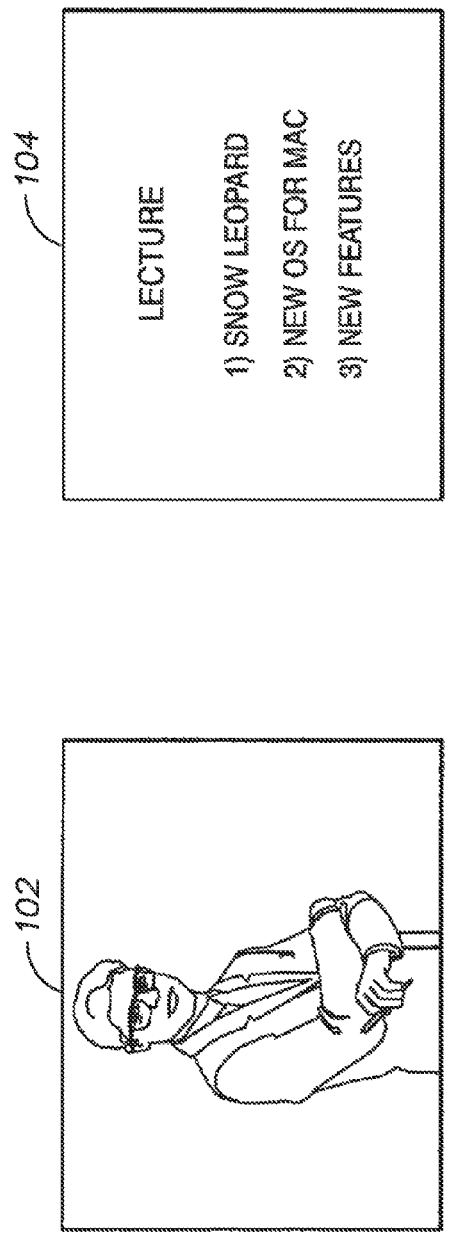
FIG. 1A
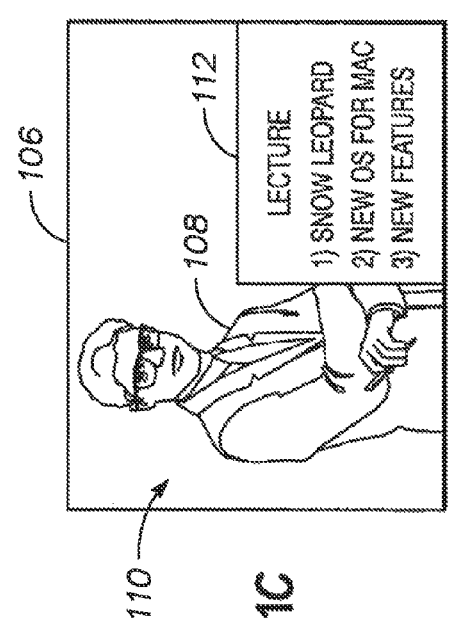
FIG. 1B
FIG. 1C
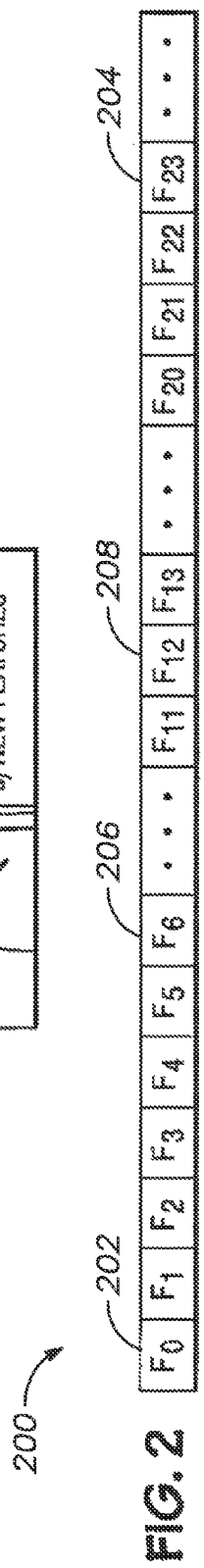
FIG. 2

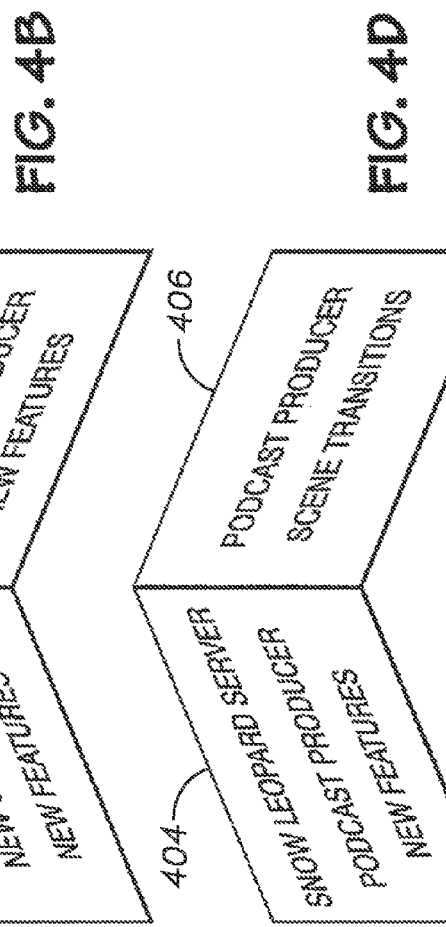
FIG. 4A
FIG. 4B
FIG. 4C
FIG. 4D
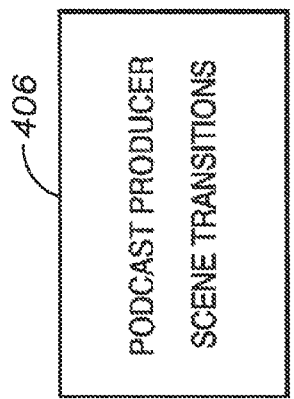
FIG. 4E

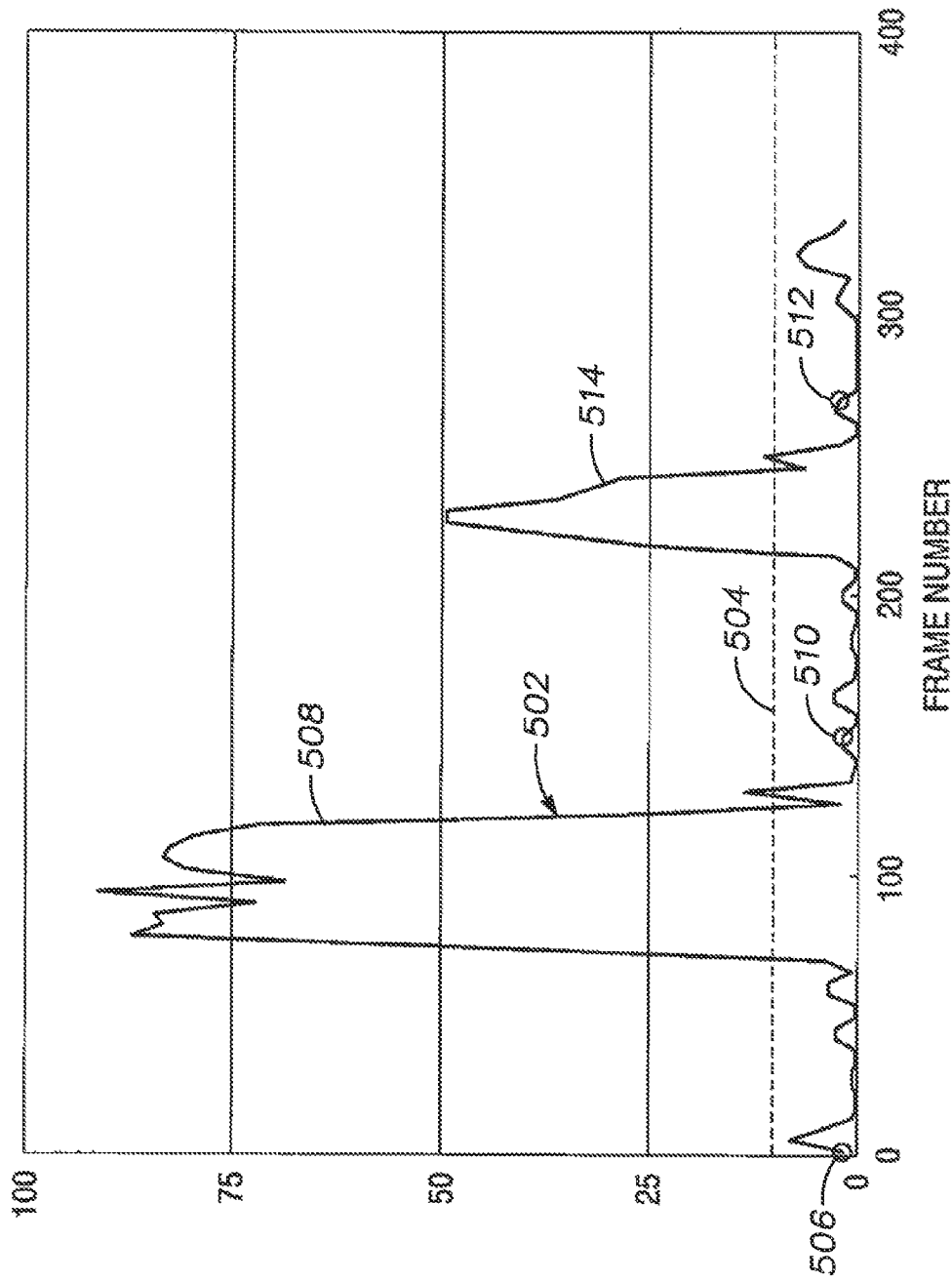

METHOD AND APPARATUS FOR IDENTIFYING VIDEO TRANSITIONS

BACKGROUND

The present invention relates generally to methods and apparatus for identifying transitions in video data, and more specifically relates to new methods and apparatus for evaluating video data comprising presentations of still images to determine the transitions from one still image to another.

Many techniques are known for identifying transitions such as changes of scene, in video presentations. One use for such identifying such as transitions is the identification of chapter markers within the video presentation that allow a viewer to selectively move to a desired location in the presentation. In order to facilitate that type of navigation, the frames associated with the chapter markers are often presented to the user as an index, allowing identification of the subject matter at each location, as well as navigation to a selected "chapter" of the video presentation.

Because of the inherent nature of video in presenting persons or objects in motion, previous attempts to bring some degree of automation to identifying transitions have focused on ways of evaluating frames of data based on changes of "scenes" potentially reflecting a sufficient change in visual content to warrant identification with a chapter marker. Thus, such changes between scenes in such conventional motion-conveying video presentations have focused on various parameters in the motion-conveying video that one might ordinarily associate with changes of content in the video presentation, such as changes in contrast and/or color (potentially indicating the depiction of a new environment or "scene"); or detection of parameters indicating the depiction of motion, which may be of numerous forms including that which might result from a change in the observation perspective (resulting from a change of camera position such as by panning, tilting, zooming or rotating the camera), or motion of a person or object in the video presentation.

While these methods offer varying qualities of results in evaluating conventional motion-centric video presentations, the methods are not believed to be well-suited to detecting changes resulting from the depiction of one still image followed by another still image presented in a video. One example of this type of video presentation can be envisioned as a static or slowly panning depiction of still images, such as drawings or paintings, accompanied by a narration. If two time-offset still images are close to one another in color and contrast, then the change from one image to the next may be hard for conventional systems to identify, although identification of an index, such as a chapter marker might be very desirable. These problems may be exacerbated by gradual transitions between the still images. A particularly problematic video type would be one depicting a series of largely text-based and/or static image-based "slides" in a video of a "slide" presentation such as those used in business and education, and prepared and presented through use of a conventional presentation authoring program such as Keynote® from Apple Inc. or PowerPoint® from Microsoft Corp.

In examples such as these slide presentations, particularly where they are primarily text-based, the background will often remain constant or generally constant, and the overall differences between consecutive slides may be relatively limited. Additionally, such slide presentations often include relatively slow-changing animations to transition between slides, such as slow "fades" from one image to another or similar effects, which do not provide images usually detectable as movement between the video frames. Thus, conventional transition identification systems are believed to be less than optimally suited to identifying the change from one still image to another still image.

Accordingly, the present invention provides new methods and apparatus to evaluate the video data underlying such video presentations, and to identify changes from one still image to another in those video presentations.

SUMMARY

The methods and apparatus described herein are particularly well-suited to identifying changes from one substantially still image to another in a video presentation. The term "substantially still image" as used herein refers to an image that contains little movement within the image, but might include, for example, animations of text onto or off of a page, relatively slow panning of a static graphic image, etc.). Common examples may be found in the above-described slides that may be substantially text-based, or some combination of text and static graphic images.

Describing the processing in terms of the observable video presentation itself, a series of individual video frames from the video presentation are extracted for use in the analysis process, in accordance with a desired operational parameter. Preferably, successive pairs of the extracted video frames will be compared to one another, for example, comparing the first extracted video frame with the second extracted video frame to determine a first comparative measurement, and then comparing that second extracted video frame with the third to determine a second comparative measurement. These comparative measurements will be evaluated using a statistical measure of the magnitude of the difference between the comparative measurements, either relative to each other, or or to a reference value. The compilation of these time-oriented difference measurements may then be used to identify time-oriented patterns indicating a relatively unchanging display of content, and thereby indicating when new static images are displayed in the video presentation. Preferably, all of the identified operations are performed in the digital domain, on the underlying digital video data used to present the above-described video frames to a viewer.

BRIEF DESCRIPTION OF THE FIGURES

FIG. 1 depicts an example of a multiple component video, including a primarily text-based slide presentation, wherein: FIG. 1A depicts a video frame of a conventional motion-centric video; FIG. 1B depicts a video frame of a conventional text-based slide presentation video; and FIG. 1C depicts a video frame of a combination of the two videos into a single video.

FIG. 2 depicts a block diagram representation of video data including a series of frames such as would be represented by an encoded video data stream.

FIGS. 4A-E depict selected frames of a video presentation showing transitions between text-based slides.

FIG. 5 depicts a draft of evaluated video content as may be generated in accordance with the method of FIG. 3, and as would correlate generally with a video presentation such as that depicted in FIGS. 4A-E.

DETAILED DESCRIPTION OF PREFERRED EMBODIMENTS

Figure 3:
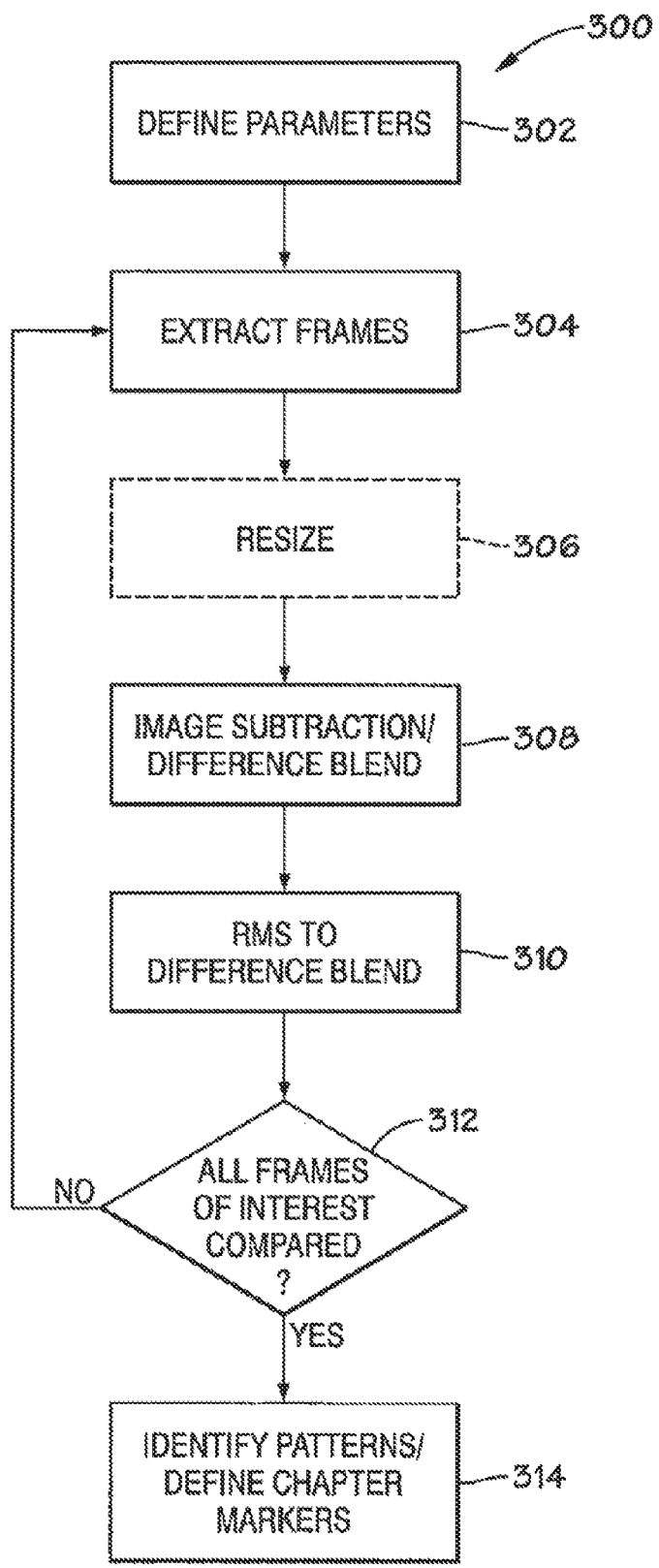
FIG. 3 depicts a flow chart of an example method for identifying video transitions.

The following detailed description refers to the accompanying drawings that depict various details of embodiments selected to show, by example, how the present invention may be practiced. The discussion herein addresses various examples of the inventive subject matter at least partially in reference to these drawings and describes the depicted embodiments in sufficient detail to enable those skilled in the art to practice the invention. However, many other embodiments may be utilized for practicing the inventive subject matter, and many structural and operational changes in addition to those alternatives specifically discussed herein may be made without departing from the scope of the invented subject matter.

In this description, references to "one embodiment" or "an embodiment," or to "one example" or "an example" mean that the feature being referred to is, or may be, included in at least one embodiment or example of the invention. Separate references to "an embodiment" or "one embodiment" in this description are not intended to refer necessarily to the same embodiment; however, neither are such embodiments mutually exclusive, unless so stated or as will be readily apparent to those of ordinary skill in the art having the benefit of this disclosure. Thus, the present invention can include a variety of combinations and/or integrations of the embodiments described herein, as well as further embodiments as defined within the scope of all claims based on this disclosure, as well as all legal equivalents of such claims.

For the purposes of this specification, a "processor-based system" or "processing system" includes a system using one or more processors, microcontrollers and/or digital signal processors having the capability of running a "program," which is a set of executable machine code. A "program," as used herein, includes user-level applications as well as system-directed applications or daemons. Processing systems include communication and electronic devices such as cell phones, music players, and Personal Digital Assistants (PDA); as well as computers, or "computing devices" of all forms (desktops, laptops, servers, palmtops, workstations, etc.).

The example of the invention provided herein will be discussed in reference to an embodiment of a computing device, such as the example system depicted in FIG. 6, and discussed in reference to such figure. Additionally, the provided example will be in the context of process to create a composite video product, such as a video podcast.

The term "video presentation" as used herein is intended to refer to the observable video product, formed of a succession of "video frames" as will be displayed as a function of the underlying video data set. The video data set will in most cases be a video data file, but may also include live capture or streaming video data.

Referring now to the drawings in more detail, and particularly to FIG. 1, the figure depicts an example of a composite video including a primarily text-based slide presentation video, wherein: FIG. 1A depicts a video frame of a conventional motion-centric video 102; FIG. 1B depicts a video frame of a conventional text-based slide presentation video 104; and FIG. 1C depicts a video frame of a combination of the two videos into a single, composite picture-in-picture video 106. In this example, video presentation 104 depicts a series of primarily text-based slides, such as would accompany, for example, an educational or business presentation, as represented by video presentation 102. As will be apparent from the discussion to follow, the methods and techniques described herein are primarily adapted for facilitating identifying chapters, and inserting chapter markers, in a video stream that includes multiple still images, as represented by video presentation 104. Those skilled in the art will recognize that in many instances, video presentations including multiple still images will also include motion, such as, for example, a video clip presented in a Keynote slide. Accordingly, a video presentation that includes a series of multiple static images, which may be of either a graphic or textual nature (such as, in this example text-based slides) may also include some non-static images, including, for example, animations (including animations of textual elements, slide transitions, etc.) and video clips.

As noted above, FIG. 1C depicts an example of a composite video wherein the video presentations 102 and 104 are combined together in a synchronized, composite picture-in-picture video presentation 106. In this circumstance, chapter markers may be identified based upon slide changes in video presentation 104, and may be applied to define chapters in the combined video presentation 106. Video presentation 106 may be presented uniformly, such as, for example, with one video presentation occupying a primary space, indicated generally at 110, such as the speaker 108 from video presentation 102; and the slide presentation occupying the picture-in-picture space 112. Alternatively, however, it is possible to alternate the relative positions of the two underlying video presentations 102 and 104. As one example, the chapter markers defined as described herein may be used in the workflow defining the rendering of the composite video presentation 106 to display the textual content according to a pre-selected criteria. For example, the placement of the two video presentations might switch in response to identified chapter markers, for example, periodically displaying the still image (here, textual content) in the primary space for a selected period of time, or for a selected number of video frames, after a chapter marker identification indicating a content change in the still image (here, by presentation of a new slide). A system for changing the display of the video components in a composite video is described in U.S. patent application entitled Automatic Content Creation, Ser. No. 11/619,998, filed Jan. 4, 2007, on behalf of Bertrand Serlet, which application is assigned to the owner of the present application; and which is incorporated herein by reference for all purposes.

Defining the chapter markers for video presentation 104 preferably includes a comparison of the video data representative of selected video frames that will be displayed to a viewer. This comparison may be performed either on raw video data or encoded video data. As a practical matter, in most cases the video will not be raw, but will be compressed and encoded in some desired format. While it is possible to perform the comparison between each frame and the frame that directly follows it, for most applications that degree of precision is not required. As a result, it is considered advantageous to compare each video frame with a successive (or subsequent), but non-sequential, video frame.

Referring now also to FIG. 2, the figure depicts a series of video frames 200 as would be displayed in a video presentation. The series begins with frame $F_0$ 202 and continues on beyond $F_{23}$ 204. In this example, the determination may be made to compare non-sequential frames, at an interval of 6 frames. In this example, frame $F_6$ 206 will be the video frame compared with the first video frame $F_0$ 202, and subsequently, frame $F_{12}$ 208 will be compared to frame $F_6$ 202, etc. The interval between the frames may be established as desired, to balance the need for precision in location of a chapter marker versus the processing power and/or time required. In most cases, depending upon the encoding utilized, video will be presented at approximately 15-60 frames per second, with rates of approximately 24-30 frames per second being common at the time of filing of this application. Accordingly, for many conventional applications, performing a comparison between frames at a frame interval of 3 to 10 frames is satisfactory. As an alternative to selecting a spaced interval, the system could be configured to dynamically determine intervals for such frames, perhaps making such determinations through use of a learning algorithm based on previously determined transitions.

In addition to performing the comparison on frames at spaced intervals in order to reduce the required processing power and time, it is also possible, and typically preferable, to perform the comparison on a reduced resolution representation of the video frame. For example, the resolution may be reduced by a desired factor, for example, for many applications, a factor of between 5 and 25, with 10 being satisfactory for many applications.

It should be understood that the presently described techniques are not applied literally to the "video frame," but are performed in the digital domain, and thus are applied to the video data representing the frame that will be displayed. Thus, while the present description, for clarity of illustration, describes operations in terms of comparing "video frames," that comparison is actually taking place in the underlying digital data realm rather than in the visually observable realm.

Referring now to FIG. 3, the figure depicts a flow chart of an example process 300 for defining chapter markers. The first step in process 300 is to define the parameters 304 that will be used in the process. Depending upon the specific capabilities and variability desired for the system, the operational parameters may vary. In some examples of processes, the following parameters are established: a frame interval or "window" to be compared (as described above); a reduction factor representing a scaling to be applied to reduce the number of pixels in the frames to be compared; a threshold that will be used to identify peaks representing transitions, as will be described in more detail later herein; and a tolerance factor defining a period of stability (such as a minimum number of frames) before another chapter marker can be accepted, which provides a mechanism for adjusting for effects of noise and similar artifacts. Each of these parameters will be discussed further in reference to other operations depicted in FIG. 3.

The next operation is to extract the video data representing the frames to be compared 304, those frames defined by the selected frame interval for example (as previously described, wherein a frame "0" will be compared with claim "6," which will then be compared with frame "12," in accordance with the pattern as described in relation to FIG. 2). The video data representing the frames to be compared may be extracted from the video file through use of suitable video processing technology known to the art. An example suitable technology is the Core Image image processing and rendering functionality included within the OS X 10.4 (and higher) operating systems available from Apple Inc. Core Image can perform operations at the pixel level, which is a preferred processing technique for the operations described herein.

Once the frames are extracted 304, then if desired, the frames will be resized to reduce the pixels to be compared, as described above. For example, if a scaling factor of /10 is to be applied, the image will be reduced in resolution by that factor, allowing the operations to be described subsequently to be performed on a lesser number of pixels. Again, a suitable technology for performing the described scaling is Core Image, or alternatively QuickTime and Core Video, each again available from Apple Computer Inc.

Subsequently, the resized images will be sequentially compared as noted above. Although many types of pixel-based, frame to frame comparisons are known, one example of a preferred comparison technique is a subtraction of spatially corresponding pixels between the two frames, termed in the art a "difference blend" measurement. With such a difference blend measurement if two pixels corresponding to the same location placement in the two frames (such as, for example corresponding to common Cartesian coordinates in each video frame) are an exact match, then the result would be a completely black pixel representative of zero difference between those two corresponding pixels (because the resulting difference value of all colors is 0). The comparison of the video data underlying the two video frames in this manner will yield a pixel by pixel identification of differences between the two frames. This difference blend may again be determined through use of Core Image.

Although determining a difference blend between images is well known in the art, an example implementation is represented by the following equation:

$$\text{image } \{p1, p2\} = \sum_{c=0}^{2} \sum_{m=0}^{M-1} \sum_{n=0}^{N-1} |p1[m][n][c] - p2[m][n][c]| \quad \text{eq. 1}$$

Wherein:

p1 represents a pixel from the first image;

p2 represents a pixel from the second image;

M represents the height in number of pixels;

N represents the width in number of pixels;

m represents the x-axis coordinate of the pertinent pixel in the video frame;

n represents y-axis coordinate of the pertinent pixel in the video frame; and c represents the color value of the pixel (for example R, G, B in a RGB color model).

The next operation is to identify when those pixel by pixel differences suggest that a change in content occurs from a first generally static image to a second generally static image. As noted previously, the changes from one static image to another may be very small, particularly when the background remains generally constant and the differences are found in lines or blocks of text. Thus, techniques based upon determining scene changes in motion-centric video are less than optimal for identifying these relatively small changes of substantially static images. In accordance with the present method, however, the inventors have found that determining a statistical measure of the magnitude of the difference measurements yields a number that is representative of a change in composite energy that may be used in an analysis to determine transitions between frames depicting substantially still images. A preferred statistical measure is to perform a Root Mean Square ("RMS") analysis on the difference measurements, and the result will yield a single number representative of the energy differential relative to a completely black image. The series of such energy differential measurements may be used to evaluate the often visually subtle changes in a series of video frames wherein a change between substantially static images occurs.

Accordingly, at step 310, such an RMS measure is made. An example of this calculation is down from the following equation:

$$\text{RMS}\{p1, p2\} = \sqrt{\frac{1}{3MN} \sum_{c=0}^{2} \sum_{m=0}^{M-1} \sum_{n=0}^{N-1} |p1[m][n][c] - p2[m][n][c]|^2} \quad \text{eq. 2}$$

This RMS measure is made (see step 312) for each difference blend of the series of compared pixel pairs. Once all the measurements are made, the resultant curve of the energy differential measurements facilitates the identification of the static image changes, as indicated at step 314.

Referring now to FIGS. 4A-E and 5, FIGS. 4A-E depict a series of example slides and transitions of text-based presentation slides; and FIG. 5 depicts a curve of energy differential measurements of a form similar to that which would be generated by slides as depicted in FIGS. 4A-E. FIG. 4A depicts an opening text-based slide 402 followed by an animation depicted in FIG. 4B simulating a rotation of the first slide out of the viewing position, and then moving a second slide 404 into the viewing position as depicted in FIG. 4C, then again simulating a rotation of the second slide out of the viewing position and moving a third slide 406 into view in FIG. 4D, and finally to the viewing position in FIG. 4E. In graph 500 of FIG. 5, the curve 502 is plotted from the individual energy differential measurements of spaced frames as described in reference to FIGS. 2 and 3. The x-axis of the graph is referenced to frames in the series of compared frames and the y-axis of the graph represents a magnitude of determined energy differentials, as to which the specific scaling to be used may be selected in relation to the performance needs and capabilities of the specific system used. A threshold level 504 is defined on graph 500 in accordance with the initial parameters established at step 302 in FIG. 3. As can be seen at frame "0" 506, curve 502 although not flat, is relatively stable and consistently below threshold level 504. Subsequently, there is a wide spike 508 above threshold level 504, approximately centered around frame 100, indicated on the x-axis. This type of energy differential spike would be expected with a transition such as that depicted in FIG. 4B.

Referring to the remainder of curve 502, it can be seen that there are two subsequent periods of general stability below threshold level 504, indicated at 510 and 512, respectively. Those two periods of stability are separated by another peak 514 above threshold level 504 and approximately centered around frame 240. As with peak 508, peak 514 is of a type that would be expected with a transition such as that depicted in FIG. 4D.

Thus, by evaluating periods of stability below threshold level 504 relative to transitions indicated by measurements extending above threshold level 504 the periods of display of a static image can be identified, and chapter markers may be established at desired points proximate the beginning of those periods of stability, as indicated at 506, 510 and 512. Those skilled in the art will recognize that the fluctuations in curve 502 in each stability period 506, 510, 512 are primarily the result of encoding variations in the encoding technique, such as might be observed with H.264/MPEG-4 encoding.

As noted previously, these chapter markers may be used to provide indexing and user access to desired portions of the video. Additionally, as discussed in reference to FIGS. 1A-C, multiple video streams may be combined, and the chapter markers as defined above may be used to index the combined video presentation. Also as discussed in reference to such figures, the chapter markers may be used to change the video presentation.

Figure 6:
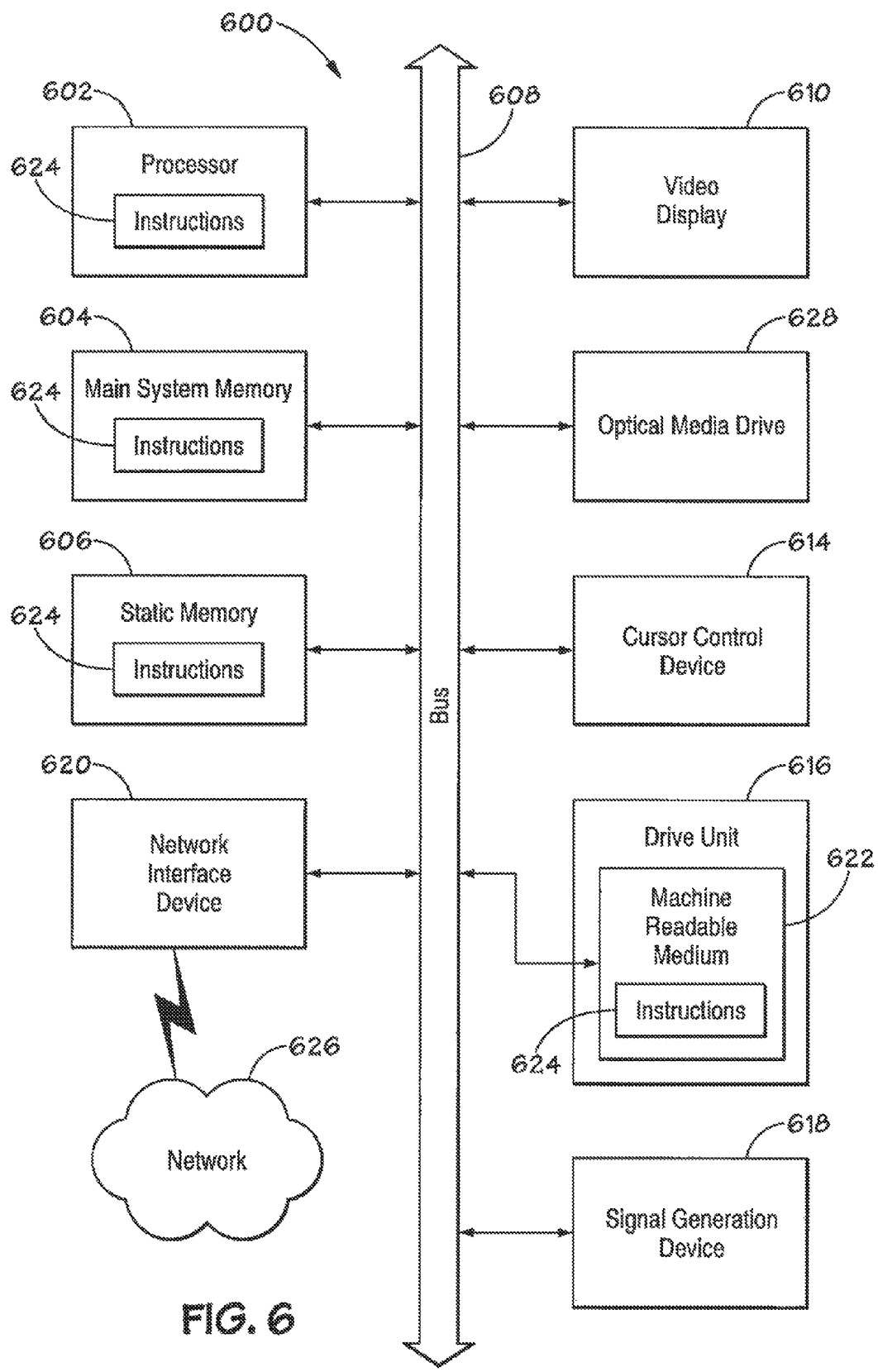
FIG. 6 depicts an example processing system, depicted as a computing system, as an example of a system that could be used to implement the techniques and operations described herein.

Referring now to FIG. 6, the figure depicts an example computing device suitable for use in performing the described operations. Example computing device 600 includes processor 602 (e.g., a central processing unit (CPU), a graphics processing unit (GPU) or both), main system memory 604 and static memory 606, which communicate with each other via bus 608. Computing device 200 may further include video display unit 610 (e.g., a plasma display, a Liquid Crystal Display (LCD), Organic Light Emitting Diode (OLED) display, Thin Film Transistor (TFT) display, or a cathode ray tube (CRT)). Computing device 600 also includes optical media drive 104, user interface (UI) navigation device 614 (e.g., a mouse), disk drive unit 616, signal generation device 618 (e.g., a speaker), optical media drive 628, and network interface device 620.

Disk drive unit 616 includes machine-readable medium 622 on which is stored one or more sets of instructions and data structures (e.g., software 624) embodying or utilized by any one or more of the methodologies or functions described herein. Software 624 may also reside, completely or at least partially, within main system memory 604 and/or within processor 602 during execution thereof by computing device 200, with main system memory 604 and processor 602 also constituting machine-readable, tangible media. Software 624 may further be transmitted or received over network 626 via network interface device 620 utilizing any one of a number of well-known transfer protocols (e.g., Hypertext Transfer Protocol (HTTP)).

While machine-readable medium 622 is shown in an example embodiment to be a single medium, the term "machine-readable medium" should be taken to include a single medium or multiple media (e.g., a centralized or distributed database, and/or associated caches) that store the one or more sets of instructions. The term "machine-readable medium" shall also be taken to include any medium that is capable of storing or encoding a set of instructions for execution by the machine and that cause the machine to perform any one or more of the methodologies of the present application, or that is capable of storing or encoding data structures utilized by or associated with such a set of instructions. The term "machine-readable medium" shall accordingly be taken to include, but not be limited to, solid-state memories, optical and magnetic media, and other structures facilitating reading of data stored or otherwise retained thereon.

Many modifications and variations may be made to the techniques and structures described and illustrated herein without departing from the scope of the present invention. Accordingly, the present specification must be understood to provide examples to illustrate the present inventive concepts and to enable others to make and use those inventive concepts.

We claim:

1. A method of identifying chapter markers in a video presentation, comprising the acts of:

receiving first video data representative of a presentation comprising a plurality of static images;

receiving second video data;

combining the first video data and the second video data to form a composite video;

extracting a first portion of the first video data representative of a first video frame and a second portion of the first video data representative of a second video frame;

determining a difference blend measurement for each of a plurality of pairs of spatially corresponding pixels between the first video frame and the second video frame;

evaluating the difference blend measurements for the plurality of pairs of spatially corresponding pixels at least in part through use of a Root-Mean-Square (RMS) analysis;

identifying, based at least in part on the analysis, a transition point between the first video frame and the second video frame, wherein the transition point is representative of a transition between consecutive static images in the presentation; and associating a chapter marker with the composite video based, at least in part, on the identified transition point, wherein a positioning of a display of the first video data relative to a display of the second video data in the composite video is adjusted for a specified time period after the chapter marker.

2. The method of claim 1, wherein the first video data comprises one or more packets of digital data representative of each frame of the presentation.

3. The method of claim 1, wherein the first and second video frames are successive frames of the first video data.

4. The method of claim 1, wherein the first and second video frames are non-sequential, and are extracted according to at least one pre-selected criteria.

5. The method of claim 1, further comprising scaling the first and second video frames.

6. The method of claim 1, wherein the first and second video frames are non-sequential, and are separated by at least two sequential video frames.

7. A method of processing digital video data, comprising the acts of:

receiving a first digital video data set representative of a presentation comprising a plurality of static images;

receiving a second digital video data set;

combining the first digital video data set and the second digital video data set to form a composite video data set;

extracting digital video data representative of a plurality of video frames from the first digital video data set;

processing the extracted digital video data to reduce the amount of data associated with each video frame of the plurality of video frames;

determining a pixel-based difference blend result for each of a plurality of spatially corresponding pixels of immediately successive video frames of the plurality of video frames;

performing a Root-Mean-Square analysis of the difference blend results to determine a measure of a magnitude of the difference blend results relative to a reference; and identifying one or more transitions between static images of the first digital video data set based, at least in part, on the Root-Mean-Square analysis of the difference blend results, wherein a positioning of a display corresponding to the first digital video data set relative to a display corresponding to the second digital video data set in the composite video data set is adjusted for a specified time period after the identified one or more transitions.

8. The method of claim 7, further comprising the act of generating chapter markers associated with the composite video data set based, at least in part, on the identified transitions.

9. The method of claim 8, wherein the chapter markers are used to index the composite video data set.

10. The method of claim 9, wherein the second digital video data set is of a video presentation substantially containing moving images.

11. The method of claim 7, wherein each pair of immediately successive extracted video frames is separated by at least two sequential video frames of the first digital video data set.

12. A non-transitory machine-readable medium containing instructions that when executed by one or more processors cause the one or more processors to perform operations comprising:

receiving first video data representative of a presentation comprising a plurality of static images;

receiving second video data;

combining the first video data and the second video data to form a composite video;

extracting a first portion of the first video data representative of a first video frame and a second portion of the first video data representative of a second video frame;

determining a pixel-based difference measure for each of a plurality of pairs of spatially corresponding pixels between the first video frame and the second video frame;

evaluating the pixel-based difference measures for the plurality of pairs of spatially corresponding pixels at least in part through use of a Root-Mean-Square analysis;

identifying, based at least in part on the analysis, a transition point between the first video frame and the second video frame, wherein the transition point is representative of a transition between consecutive static images in the presentation; and associating a chapter marker with the composite video based, at least in part, on the identified transition point, wherein a positioning of a display of the first video data relative to a display of the second video data in the composite video is adjusted for a specified time period after the chapter marker.

13. The non-transitory machine-readable medium of claim 12, wherein the operations further comprise reducing a resolution of the first and second video frames prior to determining the pixel-based difference measures.

14. The non-transitory machine-readable medium of claim 12, wherein the first and second video frames are non-sequential, and are separated by at least two sequential video frames.

* * * * *

UNITED STATES PATENT AND TRADEMARK OFFICE
CERTIFICATE OF CORRECTION

PATENT NO. : 8,582,952 B2
APPLICATION NO. : 12/560005
DATED : November 12, 2013
INVENTOR(S) : Circlaeys et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 495 days.

Signed and Sealed this
Tenth Day of March, 2015

Michelle K. Lee
*Deputy Director of the United States Patent and Trademark Office*